United States Patent
Kim et al.

(10) Patent No.: US 9,601,730 B2
(45) Date of Patent: Mar. 21, 2017

(54) SECONDARY BATTERY FRAME AND BATTERY PACK INCLUDING THE SAME

(71) Applicant: LG CHEM, LTD., Seoul (KR)

(72) Inventors: Tae-Wook Kim, Daejeon (KR); Hyung-Ku Yun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/760,000

(22) PCT Filed: Sep. 5, 2014

(86) PCT No.: PCT/KR2014/008395
§ 371 (c)(1),
(2) Date: Jul. 9, 2015

(87) PCT Pub. No.: WO2015/037890
PCT Pub. Date: Mar. 19, 2015

(65) Prior Publication Data
US 2015/0340670 A1 Nov. 26, 2015

(30) Foreign Application Priority Data

Sep. 10, 2013 (KR) .................. 10-2013-0108418
Sep. 4, 2014 (KR) .................. 10-2014-0117873

(51) Int. Cl.
*H01M 2/10* (2006.01)
*H01M 10/42* (2006.01)
(Continued)

(52) U.S. Cl.
CPC ....... *H01M 2/1061* (2013.01); *H01M 2/0275* (2013.01); *H01M 2/1016* (2013.01);
(Continued)

(58) Field of Classification Search
CPC ............. H01M 2/0275; H01M 2/1061; H01M 2220/30; H01M 2220/20; H01M 10/425; H01M 2/30; H01M 2220/10; H01M 2/1072

See application file for complete search history.

(56) References Cited

U.S. PATENT DOCUMENTS

2006/0162149 A1 7/2006 Ha et al.
2009/0017373 A1 1/2009 Yamasaki et al.
(Continued)

FOREIGN PATENT DOCUMENTS

EP 2 557 610 A1 2/2013
JP 2010-27422 A 2/2010
(Continued)

OTHER PUBLICATIONS

International Search Report, issued in PCT/KR2014/008395, mailed Jan. 7, 2015.

*Primary Examiner* — Emily Le
*Assistant Examiner* — Monique Wills
(74) *Attorney, Agent, or Firm* — Birch, Stewart, Kolasch & Birch, LLP

(57) ABSTRACT

Disclosed is a secondary battery frame with improved dimension management capability and a battery pack including the same.

The secondary battery frame according to the present disclosure is used to package a pouch-type secondary battery, the secondary battery frame comprising a frame body comprising a top plate surrounding a circumferential area through which an electrode lead is exposed among a circumferential area of the pouch-type secondary battery, a left plate connected to a left edge of the top plate, a right plate connected to a right edge of the top plate, and a bottom plate connected to a bottom edge of the left plate and a bottom edge of the right plate; and a protrusion protrusively formed from at least one of the top plate, the bottom plate, the left plate, and the right plate in an outward direction of the frame body.

10 Claims, 20 Drawing Sheets

(51) Int. Cl.
 *H01M 2/30* (2006.01)
 *H01M 2/02* (2006.01)

(52) U.S. Cl.
 CPC .......... *H01M 2/1072* (2013.01); *H01M 2/30* (2013.01); *H01M 10/425* (2013.01); *H01M 2220/10* (2013.01); *H01M 2220/20* (2013.01); *H01M 2220/30* (2013.01)

(56) References Cited

U.S. PATENT DOCUMENTS

| | | |
|---|---|---|
| 2009/0220853 A1 | 9/2009 | Yang et al. |
| 2010/0055558 A1 | 3/2010 | Choi et al. |
| 2010/0310909 A1 | 12/2010 | Yun et al. |
| 2011/0008653 A1* | 1/2011 | Yoon ................ H01M 10/0436 429/7 |
| 2011/0210954 A1 | 9/2011 | Murphy et al. |
| 2013/0052496 A1* | 2/2013 | Han .................... H01M 2/1061 429/72 |

FOREIGN PATENT DOCUMENTS

| | | |
|---|---|---|
| JP | 4649988 B2 | 3/2011 |
| JP | 2012-123983 A | 6/2012 |
| KR | 10-2006-0073385 A | 6/2006 |
| KR | 10-1217608 B1 | 1/2013 |
| TW | I344229 B | 6/2011 |
| TW | I345849 B | 7/2011 |
| TW | M415426 U1 | 11/2011 |
| TW | 201145643 A1 | 12/2011 |

\* cited by examiner

SECONDARY BATTERY FRAME AND BATTERY PACK INCLUDING THE SAME

TECHNICAL FIELD

The present disclosure relates to a secondary battery frame and a battery pack including the same, and more particularly, to a secondary battery frame used to package a pouch-type secondary battery and a battery pack including the same.

The present application claims priority to Korean Patent Application No. 10-2013-0108418 filed in the Republic of Korea on Sep. 10, 2013 and Korean Patent Application No. 10-2014-0117873 filed in the Republic of Korea on Sep. 4, 2014, the disclosures of which are incorporated herein by reference.

BACKGROUND ART

Recently, with the dramatically increasing demands of portable electronic products such as laptop computers, video cameras, mobile phones, and the like, and competitive development of electric vehicles, storage batteries for energy storage, robots, satellite, and the like, studies are actively being conducted on high performance secondary batteries that can be recharged and used repeatedly.

Currently, available secondary batteries include nickel-cadmium batteries, nickel-hydrogen batteries, nickel-zinc batteries, lithium secondary batteries, and the like, and among them, lithium secondary batteries are gaining attention due to advantages of charging and discharging freely in the absence of a memory effect, a very low self-discharge rate, and a high energy density when compared to nickel-based secondary batteries.

On the other hand, with the approaching exhaustion of carbon energy and growing interests in environment, the demands for hybrid vehicles and electric vehicles are gradually increasing all over the world including U.S.A., Europe, Japan, and Korea. The hybrid vehicles and electric vehicles are supplied with power and can travel using charging and discharging energy of a battery pack, and thus have good reputation from many consumers in that they have high fuel efficiency and create little or no pollutant emissions, in comparison to vehicles using only engine. Thus, more interests and studies are focusing on an automotive battery essential to hybrid vehicles or electric vehicles.

FIG. 1 is an exploded perspective view schematically illustrating a configuration of a battery pack according to a related art. Referring to FIG. 1, the battery pack 10 according to the related art includes a pouch-type secondary battery 12, a protection circuit 13, a label film 14, and a frame 11.

The pouch-type secondary battery 12 is manufactured by heat fusion of an upper pouch film and a lower pouch film with a cell assembly interposed between the upper pouch film and the lower pouch film, the cell assembly formed by a stacking at least two unit cells, each unit cell including a cathode plate, a separator, and an anode plate. In this instance, because a general pouch film is made based on a thin aluminum metal layer having high ductility, the pouch-type secondary battery 12 has a disadvantage of being more prone to deformation from external impacts or the like, than a cylindrical or prismatic secondary battery.

Accordingly, in the manufacture of the battery pack 10 using the pouch-type secondary battery 12, the battery pack 10 is manufactured in the manner of mounting the pouch-type secondary battery 12 in the frame 11 to protect the cell assembly therein from external impacts or the like, while maintaining the shape of the pouch-type secondary battery 12.

The protection circuit 13 serves to prevent the pouch-type secondary battery 12 from being damaged due to an accident or the like that may occur during operation of the pouch-type secondary battery 12, or protect a user of the battery pack 10 from such accidents.

The frame 11 serves to maintain the outer shape of the pouch-type secondary battery 12, and protect the secondary battery and various circuit devices required for the secondary battery from external impacts or the like. That is, as described in the foregoing, because the pouch-type secondary battery 12 is more prone to deformation than a cylindrical or prismatic secondary battery, the frame 11 surrounding the outer surface of the pouch-type secondary battery 12 is used.

The label film 14 serves to increase the bond strength between the pouch-type secondary battery 12 and the frame 11 and prevent foreign impurities from entering a bonding portion of the pouch-type secondary battery 12 and the frame 11 or from introducing into the frame.

Because the battery pack 10 is primarily used in portable electronic devices, there is a limitation on the size of the battery pack 10. That is, when the battery pack 10 is excessively larger than a housing space of a portable electronic device, it is difficult to install the battery pack 10 in the portable electronic device.

Here, the size of the battery pack 10 is mainly determined by the size of the pouch-type secondary battery 12 and the size of the frame 11. However, it is easy to uniformly manage the standards for the frame 11, while it is not easy to uniformly manage the standards for the battery pack after the frame 11 is surrounded by the label film 14. That is, there is apprehension that the size of the battery pack may change based on a difference in thickness of the label film 14 or an extent to which the label film 14 and the frame 11 are in close contact with each other. As a result, in some instances, there may be difficulty with dimension management of the battery pack.

Additionally, due to an abnormal situation, in the event of occurrence of a phenomenon in which a wing folding part (w) of the secondary battery 12 spreads, the frame 11 surrounding the outer surface of the secondary battery 12 may be deformed. Due to deformation of the frame 11, the overall size of the battery pack increases, making dimension management of the battery pack difficult. A further detailed description will be provided with reference to FIG. 3.

FIG. 2 is a diagram illustrating a deformed state of the wing folding part of the secondary battery according to the related art. That is, FIG. 2 is a diagram illustrating the secondary battery of FIG. 1 when viewed from the rear in FIG. 1 (when viewed in the direction of arrow A).

Referring to FIG. 2, the wing folding part (w) of the pouch-type secondary battery 12 is illustrated as spreading outward. When the pouch-type secondary battery 12 received in the frame 11 is deformed as shown, the side surface of the frame 11 is subjected to outward pressure. Thus, there is apprehension that the frame 11 will spread outward. As a result, the overall size of the battery pack increases, making dimension management difficult.

Moreover, when the pouch-type secondary battery 12 expands due to a swelling phenomenon, the frame 11 may be deformed. Its description will be provided with reference to FIG. 4.

FIG. 3 is a front elevational view in cross section schematically illustrating a deformed state of the battery pack according to the related art.

Referring to FIG. 3, the pouch-type secondary battery 12 received in the frame 11 expands in the lateral direction, and the frame 11 is in a deformed state in the lateral direction. Here, a dotted line (L) surrounding the frame 11 represents a maximum tolerance of the battery pack 10 according to the related art. That is, in the case where the frame 11 is deformed within the range of the dotted line (L) as shown, such deformation is within an allowable dimensional range, but in the case where the frame 11 is deformed beyond the dotted line (L) range departing from the allowable dimensional range, the battery pack 10 is not installed in a portable electronic device, and even if it were so, the battery pack separates from the electronic device and consequently may be easily damaged by the external impacts.

However, studied have focused on the frame 11 based on a function of protecting the secondary battery, while studies about a dimension management function are yet unsatisfactory.

DISCLOSURE

Technical Problem

The present disclosure is designed to solve the above problem, and therefore, the present disclosure is directed to providing a secondary battery frame which improves dimensional stability in spite of a difference in size of a pouch-type secondary battery and has an excellent secondary battery protection effect.

The other objects and advantages of the present disclosure will be apparent from the following description and the exemplary embodiments of the present disclosure. Also, it will be readily understood that the objects and advantages of the present disclosure are realized by the means and combinations thereof set forth in the appended claims.

Technical Solution

A secondary battery frame according to the present disclosure is used to package a pouch-type secondary battery, and includes a frame body comprising a top plate surrounding a circumferential area through which an electrode lead is exposed among a circumferential area of the pouch-type secondary battery, a left plate connected to a left edge of the top plate, a right plate connected to a right edge of the top plate, and a bottom plate connected to a bottom edge of the left plate and a bottom edge of the right plate, and a protrusion protrusively formed from at least one of the top plate, the bottom plate, the left plate, and the right plate in an outward direction of the frame body.

Preferably, the protrusion may be formed on at least one of four corners formed by adjacent two plates of the top plate, the bottom plate, the left plate, and the right plate.

More preferably, each protrusion may be formed at the top edge and the bottom edge of the left plate and the top edge and the bottom edge of the right plate.

Also, preferably, each protrusion may be formed at the left edge and the right edge of the top plate and the left edge and the right edge of the bottom plate.

Also, preferably, each protrusion may be formed at the top edge and the bottom edge of the left plate, the top edge and the bottom edge of the right plate, the left edge and the right edge of the top plate, and the left edge and the right edge of the bottom plate.

More preferably, the protrusion formed at the top edge of the left plate and the protrusion formed at the left edge of the top plate may be interconnected to form a first protrusion, the protrusion formed at the top edge of the right plate and the protrusion formed at the right edge of the top plate may be interconnected to form a second protrusion, the protrusion formed at the bottom edge of the left plate and the protrusion formed at the left edge of the bottom plate may be interconnected to form a third protrusion, and the protrusion formed at the bottom edge of the right plate and the protrusion formed at the right edge of the bottom plate may be interconnected to form a fourth protrusion.

More preferably, at least a portion of the corner of at least one of the first protrusion, the second protrusion, the third protrusion, and the fourth protrusion may have a round shape.

Also, preferably, the protrusion may be integrally formed with the frame body.

Also, preferably, the protrusion may have a thickness greater than a thickness of the frame body.

Also, preferably, the frame body and the protrusion may be made of plastics.

A battery pack according to the present disclosure includes a pouch-type secondary battery, a secondary battery frame comprising a frame body and a protrusion, the frame body comprising a top plate surrounding a circumferential area through which an electrode lead is exposed among a circumferential area of the pouch-type secondary battery, a left plate connected to a left edge of the top plate, a right plate connected to a right edge of the top plate, and a bottom plate connected to a bottom edge of the left plate and a bottom edge of the right plate, and the protrusion protrusively formed from at least one of the top plate, the bottom plate, the left plate, and the right plate in an outward direction of the frame body, and a protection circuit electrically connected to the electrode lead.

Preferably, the protrusion may be formed on at least one of four corners formed by adjacent two plates of the top plate, the bottom plate, the left plate, and the right plate.

More preferably, each protrusion may be formed at the top edge and the bottom edge of the left plate and the top edge and the bottom edge of the right plate.

Also, preferably, each protrusion may be formed at the left edge and the right edge of the top plate and the left edge and the right edge of the bottom plate.

Also, preferably, each protrusion may be formed at the top edge and the bottom edge of the left plate, the top edge and the bottom edge of the right plate, the left edge and the right edge of the top plate, and the left edge and the right edge of the bottom plate.

More preferably, the protrusion formed at the top edge of the left plate and the protrusion formed at the left edge of the top plate may be interconnected to form a first protrusion, the protrusion formed at the top edge of the right plate and the protrusion formed at the right edge of the top plate may be interconnected to form a second protrusion, the protrusion formed at the bottom edge of the left plate and the protrusion formed at the left edge of the bottom plate may be interconnected to form a third protrusion, and the protrusion formed at the bottom edge of the right plate and the protrusion formed at the right edge of the bottom plate may be interconnected to form a fourth protrusion.

More preferably,

17. The battery pack according to claim 16, wherein at least a portion of the corner of at least one of the first protrusion, the second protrusion, the third protrusion, and the fourth protrusion has a round shape.

Also, preferably, the protrusion may be integrally formed with the frame body.

Also, preferably, the protrusion may have a thickness greater than a thickness of the frame body Also, preferably, the frame body and the protrusion may be made of plastics.

Advantageous Effects

According to the present disclosure, there is provided a secondary battery frame with improved dimension management capability and a battery pack including the same.

More specifically, according to the present disclosure, the secondary battery frame has a protrusion, so a dimension management range corresponding to a size of the protrusion may be provided. For example, according to the present disclosure, because the battery pack has the same size before and after surrounding with a label film, battery pack manufacturers do not need to consider a change in dimension based on the standards of the label film.

Also, because an additional subsequent process for dimension management of the pouch-type secondary battery is unnecessary, a process of manufacturing the pouch-type secondary battery may be simplified. For example, there is no need to repeat a process of cutting the pouch-type secondary battery for dimension management, or a process of bending a sealing part of the pouch-type secondary battery.

Besides, dimensional stability and consequently productivity of the battery pack may increase. That is, as a dimensional tolerance of the pouch-type secondary battery increases, the pouch-type secondary battery may be treated as a good product according to the present disclosure although the pouch-type secondary battery may be treated as a poor product according to a related art.

Also, even if the secondary battery increases in volume due to gas generation occurring in the secondary battery while the battery pack is being used, dimensional stability may be guaranteed by an extra space formed by the protrusion.

Moreover, the secondary battery frame with dimensional stability prevents the secondary battery from escaping or being exposed to outside, so the secondary battery may be protected.

BRIEF DESCRIPTION OF THE DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

MODE FOR CARRYING OUT THE INVENTION

Figure 1:
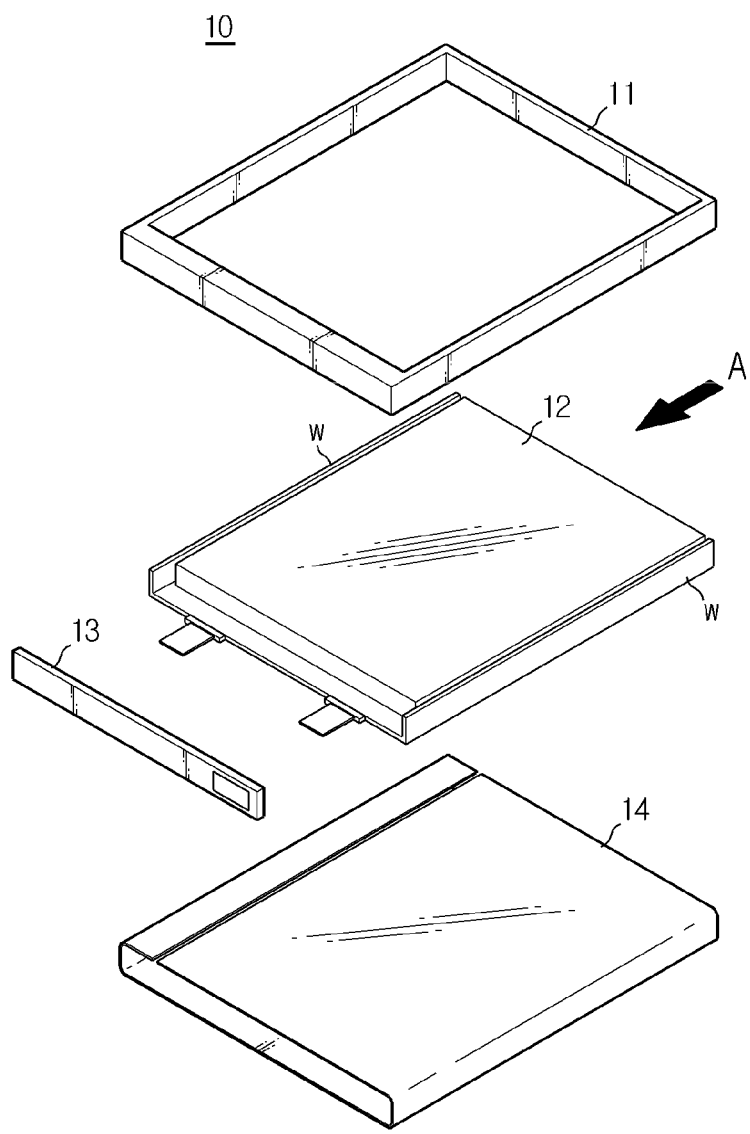
FIG. 1 is an exploded perspective view schematically illustrating a configuration of a battery pack according to a related art.
Figure 2:
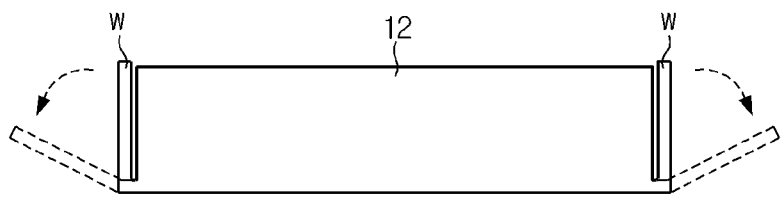
FIG. 2 is a diagram illustrating a deformed state of a wing folding part of a secondary battery according to a related art.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the spirit and scope of the disclosure.

Also, in the description of the present disclosure, when it is deemed that specific explanation of related well-known constructions or functions may obscure the essence of the invention, their detailed description is omitted. As the exemplary embodiments of the present disclosure are provided to explain the present disclosure to those skilled in the art more fully, the shape and size of the components in the drawings may be exaggerated for clarity.

Figure 4:
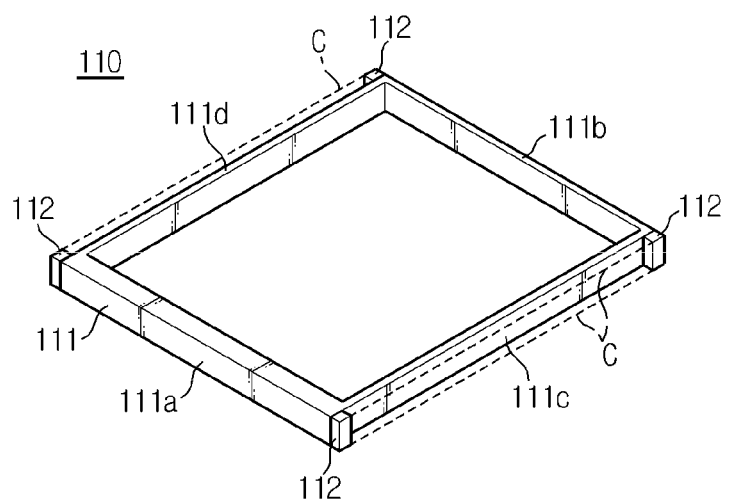
FIG. 4 is a diagram schematically illustrating a secondary battery frame according to an exemplary embodiment of the present disclosure.

FIG. 4 is a diagram schematically illustrating a secondary battery frame according to an exemplary embodiment of the present disclosure.

Referring to FIG. 4, the secondary battery frame 110 according to an exemplary embodiment of the present disclosure includes a frame body 111 and a protrusion 112. The secondary battery frame 110 is used to package a pouch-type secondary battery. Here, the pouch-type secondary battery may be manufactured by surrounding a cell assembly using a pouch case such that the cell assembly is embedded and an electrode lead attached to one end of the cell assembly is exposed to outside and then performing heat fusion on the pouch case around the cell assembly.

The frame body 111 surrounds an outer surface of the pouch-type secondary battery to protect the pouch-type secondary battery. The frame body 111 includes a top plate 111a, a left plate 111c, a right plate 111d, and a bottom plate 111b. Here, the top plate 111 a may correspond to a part surrounding a circumferential area through which the electrode lead is exposed among a circumferential area of the pouch-type secondary battery. The left plate 111c is connected to a left edge of the top plate 111a, and the right plate 111d is connected to a right edge of the top plate 111a. The bottom plate 111b is connected to bottom edges of the left plate 111c and the right plate 111d. So the frame body 111 may basically surround the four sides of the pouch-type secondary battery. In this instance, a protection circuit 130 may be provided in at least one of the top plate 111 a, the bottom plate 111b, the left plate 111c, and the right plate 111d.

However, this construction is just an example and it is obvious that surrounding five sides or six sides of the pouch-type secondary battery may be contemplated.

Particularly, according to an exemplary embodiment of the present disclosure, the protrusion 112 may be protrusively formed from the top plate 111a, the bottom plate 111b, the left plate 111c, or the right plate 111d in an outward direction of the frame body 111.

FIG. 4 illustrates an exemplary embodiment in which each protrusion 112 is formed at the top edge and the bottom edge of the left plate 111c, and each protrusion 112 is formed at the top edge and the bottom edge of the right plate 111d. The protrusion 112 protrudes out of the frame body 111 and occupies a predetermined space, and an imaginary extended line (C) formed by an outmost tangent line of the protrusion 112 provides an extra space for dimension management. The extra space for dimension management allows for dimension management when a label film 140 surrounds the secondary battery frame 110 or even if the secondary battery frame 110 expands by various reasons. Here, the secondary battery frame 110 may expand, for example, when the pouch-type secondary battery to be housed in the secondary battery frame 110 is manufactured on a little bit bigger scale in the manufacturing process, a wing folding part of the pouch-type secondary battery spreads, or the pouch-type secondary battery swells due to a chemical reaction inside the pouch-type secondary battery.

Figure 5:
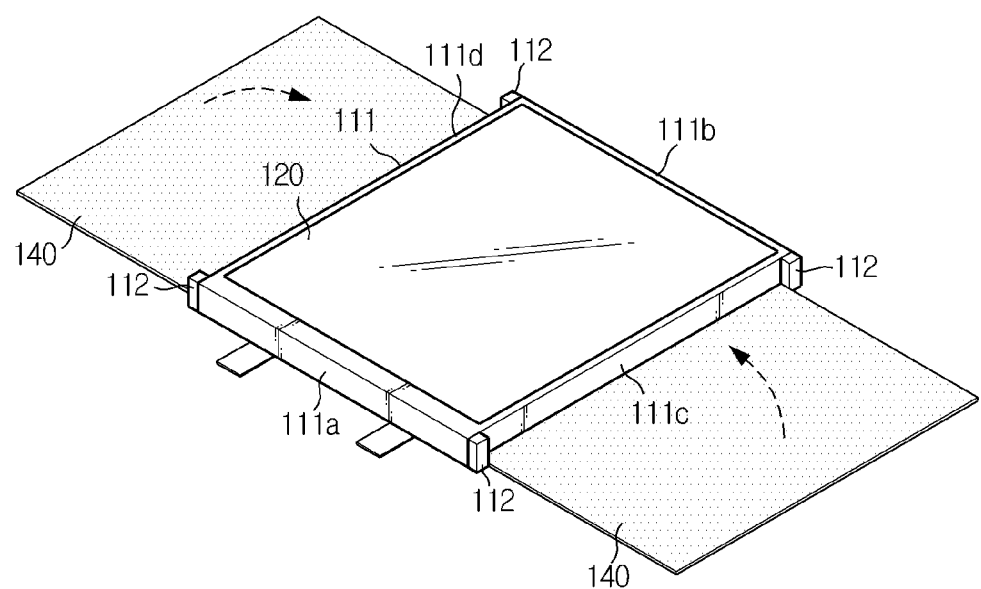
FIG. 5 is a diagram illustrating surrounding a secondary battery frame with a label film according to an exemplary embodiment of the present disclosure.
Figure 6:
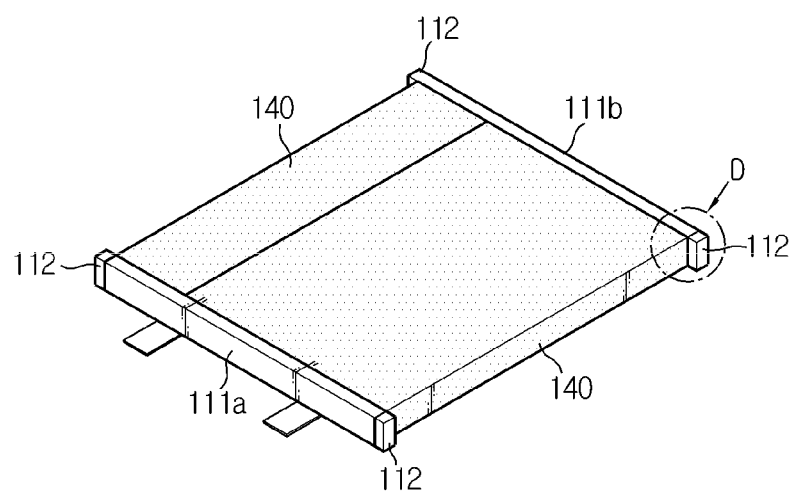
FIG. 6 is a diagram illustrating the secondary battery frame of FIG. 5 after surrounded by a label film.
Figure 7:
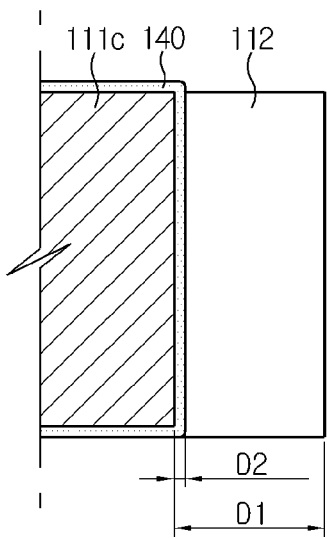
FIG. 7 is a partial cross-sectional view of section D of FIG. 6.

FIG. 5 is a diagram illustrating surrounding the secondary battery frame with the label film according to an exemplary embodiment of the present disclosure, FIG. 6 is a diagram illustrating the secondary battery frame of FIG. 5 after surrounded by the label film, and FIG. 7 is a partial cross-sectional view of section D of FIG. 6.

First, referring to FIG. 5, the label film 140 for surrounding the outer surface of the secondary battery frame 110 is prepared. The label film 140 has an adhesive coated thereon, and when the label film 140 is folded in the direction of arrows of FIG. 5, the label film 140 may be adhered to the secondary battery frame 110 and the secondary battery 120 while surrounding the secondary battery frame 110 and the secondary battery 120.

Referring to FIGS. 6 and 7, the label film 140 surrounding the secondary battery frame 110 and the secondary battery 120 is illustrated. Particularly, FIG. 7 shows that the present of the extra space for dimension management allows for dimension management in the lateral direction even after the label film 140 surrounds the secondary battery frame 110. That is, because as much extra space as a width (D1) formed by the protrusion 112 is reserved in advance, the battery pack does not change in lateral size even after the label film 140 surrounds the secondary battery frame 110. That is, as the width (D1) of the extra space is greater than a thickness (D2) of the label film 140, the battery pack does not change in lateral size even after the label film 140 surrounds the secondary battery frame 110.

Figure 8:
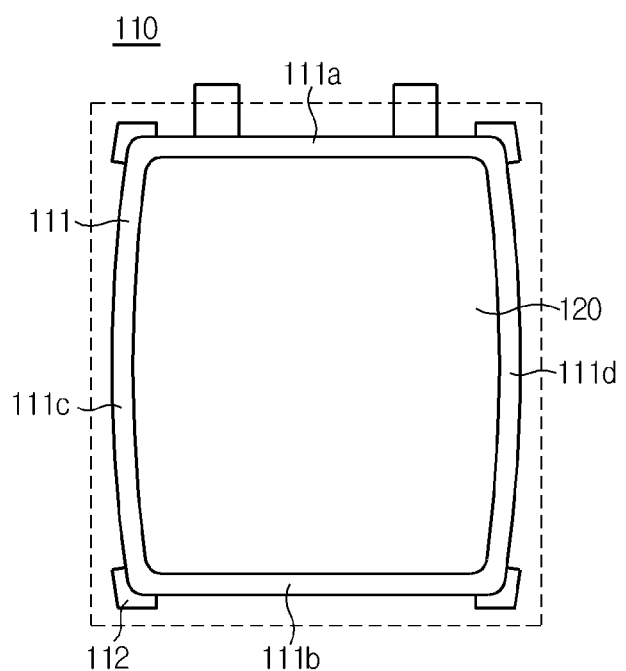
FIG. 8 is a front elevational view in cross section schematically illustrating a deformed state of a battery pack according to another exemplary embodiment of the present disclosure.

FIG. 8 is a front elevational view in cross section schematically illustrating a deformed state of the battery pack according to another exemplary embodiment of the present disclosure.

Figure 3:
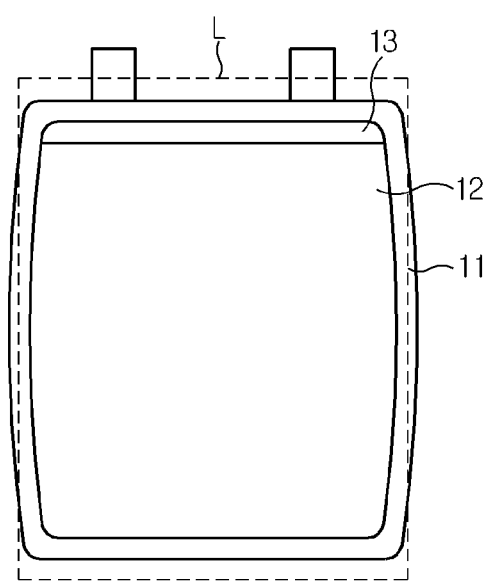
FIG. 3 is a front elevational view in cross section schematically illustrating a deformed state of a battery pack according to a related art.

Referring to FIG. 8, how dimension management is achieved by the protrusion 112 even if the secondary battery 120 expands will be clearly understood, and comparison to FIG. 3 will help in understanding more easily. In the case of FIG. 3, a maximum tolerance range is determined based on the frame body 111, but in the case of FIG. 8, a maximum tolerance range is determined based on the imaginary extended line created by the outmost tangent line of the protrusion 112. Thus, even if the secondary battery frame 110 expands, a battery pack 100 to which the secondary battery frame 110 according to the present disclosure is applied may be less influenced by expansion in the presence of the protrusion 112. Thereby, because the expanded battery pack 100 does not depart from the maximum tolerance range, dimensional stability may increase.

Although the exemplary embodiment shows that each protrusion 112 is formed at the top edge and the bottom edge of the left plate 111c and the top edge and the bottom edge of the right plate 111d, this is just an example, and according to alternative embodiments, the protrusion 112 may vary in location and/or number and/or shape.

Preferably, the protrusion 112 may be formed at least one of the four corners formed by adjacent two plates of the top plate 111a, the bottom plate 111b, the left plate 111c, and the right plate 111d.

Here, the adjacent two plates represent the top plate 111a and the left plate 111c, the top plate 111a and the right plate 111d, the bottom plate 111b and the left plate 111c, and the bottom plate 111b and the right plate 111d.

Accordingly, the four corners formed by the adjacent two plates represent a corner formed by the top plate 111a and the left plate 111c, a corner formed by the top plate 111a and the right plate 111d, a corner formed by the bottom plate 111b and the left plate 111c, and a corner formed by the bottom plate 111b and the right plate 111d.

According to the exemplary embodiment of FIG. 4, one protrusion 112 is formed at the corner formed by the top plate 111a and the left plate 111c, one protrusion 112 is formed at the corner formed by the top plate 111a and the right plate 111d, one protrusion 112 is formed at the corner formed by the bottom plate 111b and the left plate 111c, one protrusion 112 is formed at the corner formed by the bottom plate 111b and the right plate 111d. As a result, each protrusion 112 is formed at the four corners.

However, this is just an example, and various exemplary embodiments in which the protrusion 112 is formed at only any one of the four corners and the protrusion 112 is formed at each of two corners.

More preferably, each protrusion 112 may be formed at the top edge and the bottom edge of the left plate 111c and the top edge and the bottom edge of the right plate 111d. That is, the protrusion 112 may be formed as shown in FIG. 4. According to this exemplary embodiment, an extra space for dimension management is formed at the left side of the left plate 111c along a common tangent line among a tangent line of the protrusion 112 formed at the top edge of the left plate 111c and a tangent line of the protrusion 112 formed at the bottom edge of the left plate 111c. Similarly, an extra space for dimension management is formed at the right side of the right plate 111d. Thus, according to this exemplary embodiment, there is an advantage of facilitating dimension management in the direction of the left and right sides.

Figure 9:
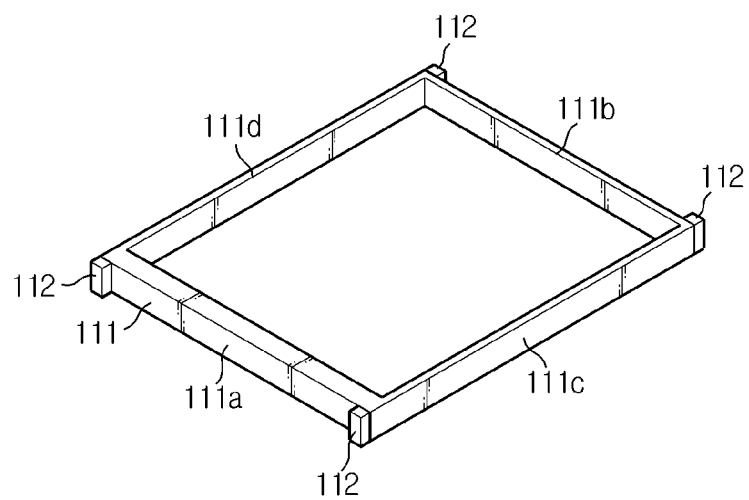
FIG. 9 is a diagram schematically illustrating a secondary battery frame according to another exemplary embodiment of the present disclosure.
Figure 10:
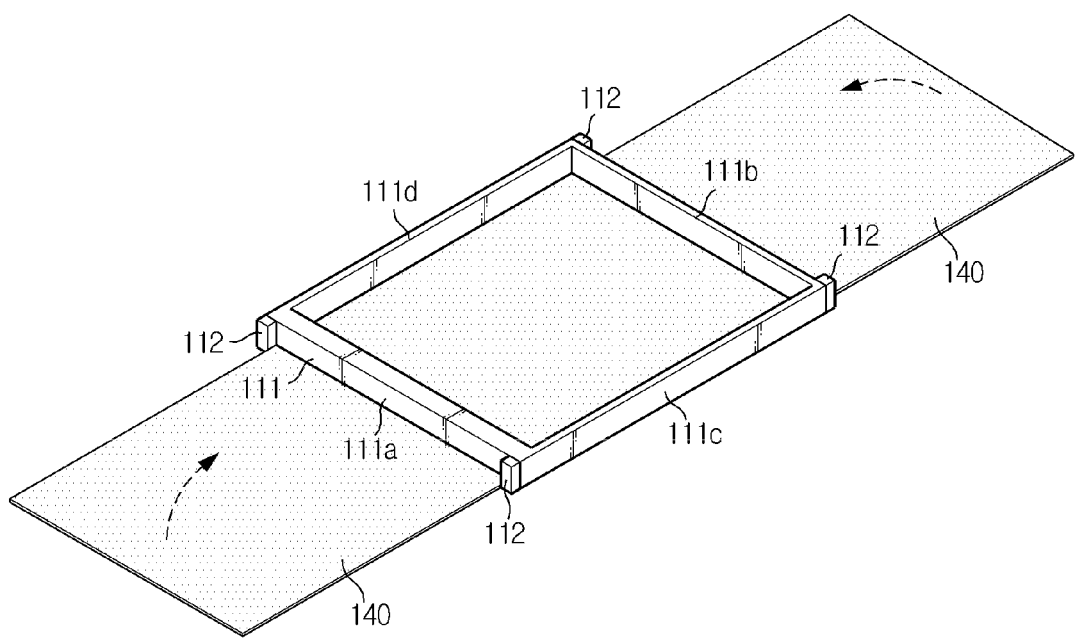
FIG. 10 is a diagram illustrating surrounding a secondary battery frame with a label film according to another exemplary embodiment of the present disclosure.

FIG. 9 is a diagram schematically illustrating a secondary battery frame according to another exemplary embodiment of the present disclosure, and FIG. 10 is a diagram illustrating surrounding a secondary battery frame with a label film according to another exemplary embodiment of the present disclosure.

Referring to FIGS. 9 and 10, each protrusion 112 may be formed at the left edge and the right edge of the top plate 111a and the left edge and the right edge of the bottom plate 111b. In this case, each extra space is formed at the top side and the bottom side by each protrusion 112 formed at the left edge and the right edge of the top plate 111a and the left edge and the right edge of the bottom plate 111b. That is, an extra space for dimension management is formed at the top side of the top plate 111a along a common tangent line among a tangent line of the protrusion 112 formed at the left edge of the top plate 111a and a tangent line of the protrusion 112 formed at the right edge of the top plate 111a. Similarly, an extra space for dimension management is formed at the bottom side of the bottom plate 111b. Thus, according to this exemplary embodiment, there are advantages in that dimension management is achieved even if the label film 140 surrounds in the direction of the top and bottom sides (see the arrows of FIG. 10), and dimension management is easy even if the secondary battery frame 110 expands to the top and bottom sides. Although not shown in the drawing, a certain part of the label film may have an empty space or may be cut such that the electrode tab or electrode lead is exposed to outside.

Figure 11:
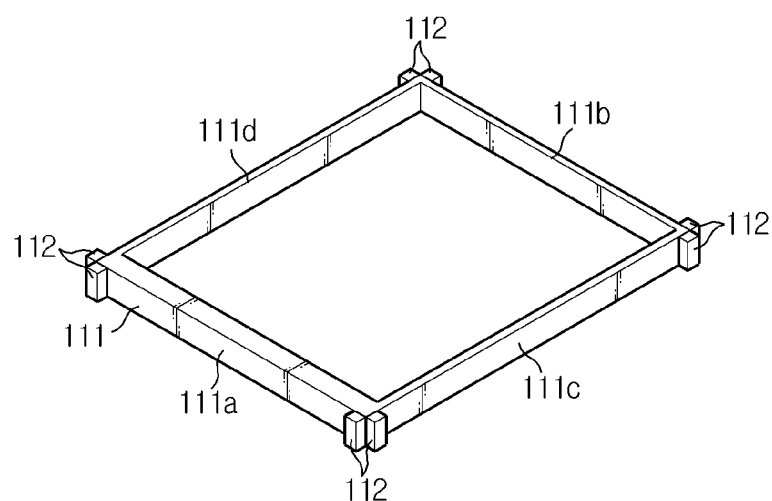
FIG. 11 is a diagram schematically illustrating a secondary battery frame according to another exemplary embodiment of the present disclosure.
Figure 12:
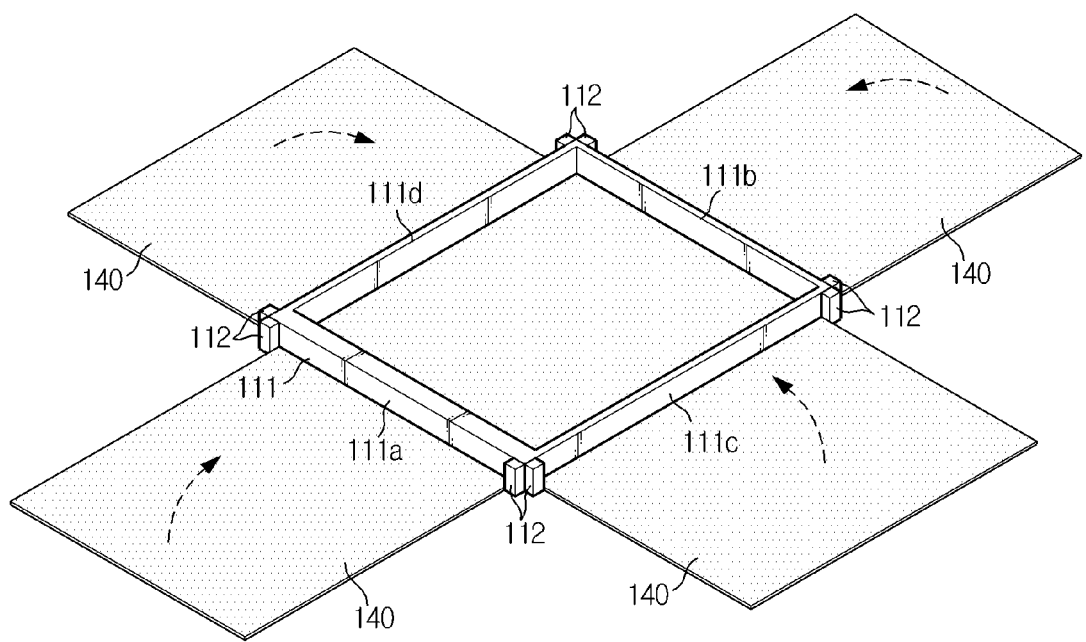
FIG. 12 is a diagram illustrating surrounding a secondary battery frame with a label film according to another exemplary embodiment of the present disclosure.

FIG. 11 is a diagram schematically illustrating a secondary battery frame according to another exemplary embodiment of the present disclosure, and FIG. 12 is a diagram illustrating surrounding a frame with a label film according to another exemplary embodiment of the present disclosure.

Referring to FIGS. 11 and 12, each protrusion 112 may be formed at the top edge and the bottom edge of the left plate 111c, the top edge and the bottom edge of the right plate 111d, the left edge and the right edge of the top plate 111a, and the left edge and the right edge of the bottom plate 111b. According to this exemplary embodiment, each extra space for dimension management is formed at the left side of the left plate 111c, the right side of the right plate 111d, the top side of the top plate 111a, and the bottom side of the bottom plate 111b.

In this instance, as shown in FIG. 12, the label film 140 is folded in the direction of the left and right sides and surrounds the secondary battery frame 120, and is folded in the direction of the top and bottom sides and surrounds and encompasses the secondary battery frame 120.

Thus, according to this exemplary embodiment, dimension management is achieved even if the label film 140 surrounds the secondary battery frame 110 in the direction of the left and right sides and the top and bottom sides, dimension management is ensured even if the secondary battery frame 110 expands to all the top and bottom sides and the left and right sides. Although not shown in the drawing, a certain part of the label film may have an empty space or may be cut such that the electrode tab is exposed to outside.

Figure 13:
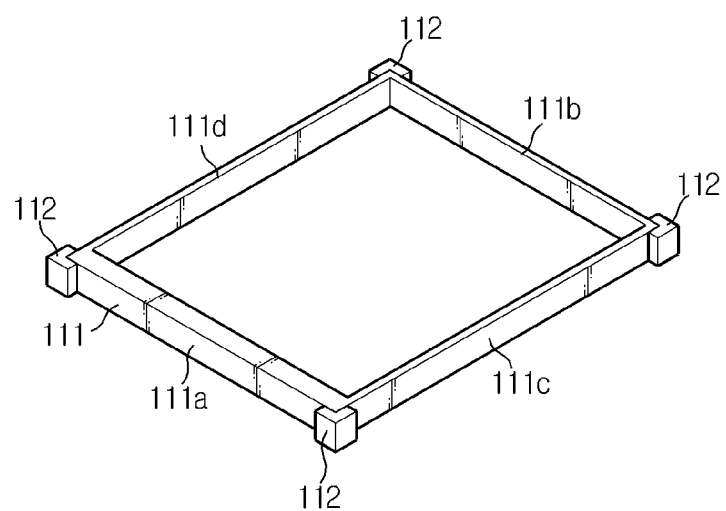
FIG. 13 is a diagram schematically illustrating a secondary battery frame according to another exemplary embodiment of the present disclosure.

FIG. 13 is a diagram schematically illustrating a secondary battery frame according to another exemplary embodiment of the present disclosure.

Referring to FIG. 13, the protrusion 112 formed at the top edge of the left plate 111c and the protrusion 112 formed at the left edge of the top plate 111a are interconnected to form a first protrusion, the protrusion 112 formed at the top edge of the right plate 111d and the protrusion 112 formed at the right edge of the top plate 111a are interconnected to form a second protrusion, the protrusion 112 formed at the bottom edge of the left plate 111c and the protrusion 112 formed at the left edge of the bottom plate 111b are interconnected to form a third protrusion, and the protrusion 112 formed at the bottom edge of the right plate 111d and the protrusion 112 formed at the right edge of the bottom plate 111b are interconnected to form a fourth protrusion.

According to this exemplary embodiment, the use of only four protrusions 112 may produce the same effect as the exemplary embodiment of FIG. 12 in which eight protrusions 112 are formed.

Here, at least a portion of the corner of the first protrusion, the second protrusion, the third protrusion, or the fourth protrusion may have a round shape.

Figure 14:
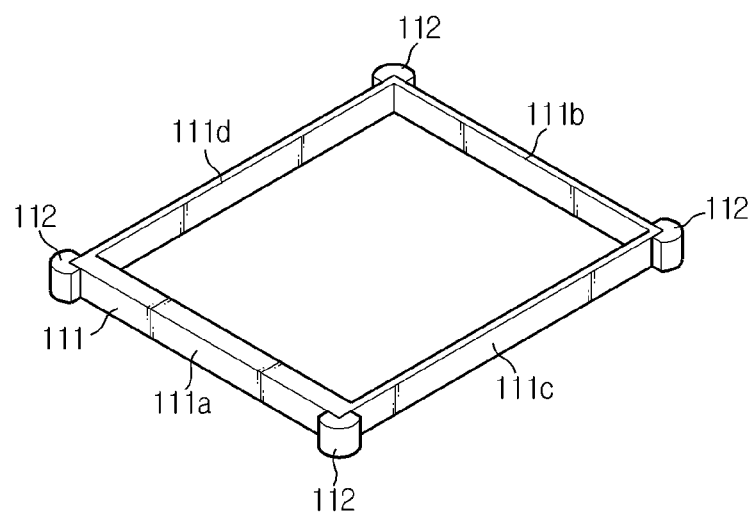
FIG. 14 is a diagram schematically illustrating a secondary battery frame according to another exemplary embodiment of the present disclosure.

FIG. 14 is a diagram schematically illustrating a secondary battery frame according to another exemplary embodiment of the present disclosure.

Referring to FIG. 14, at least portions of the corners of the first protrusion, the second protrusion, the third protrusion and the fourth protrusion have a round shape. As portions of the corners have a round shape, damage caused by friction with an external component, for example, the electronic device, may be prevented.

Although the exemplary embodiment of FIG. 14 shows portions of the corners of all the four protrusions 112 have a round shape, this is just an example, and it is obvious that some of the protrusions 112 may not have a corner in a round shape.

Also, preferably, the protrusion 112 may be integrally formed with the frame body 111. Its detailed description is provided with reference to FIG. 15.

Figure 15:
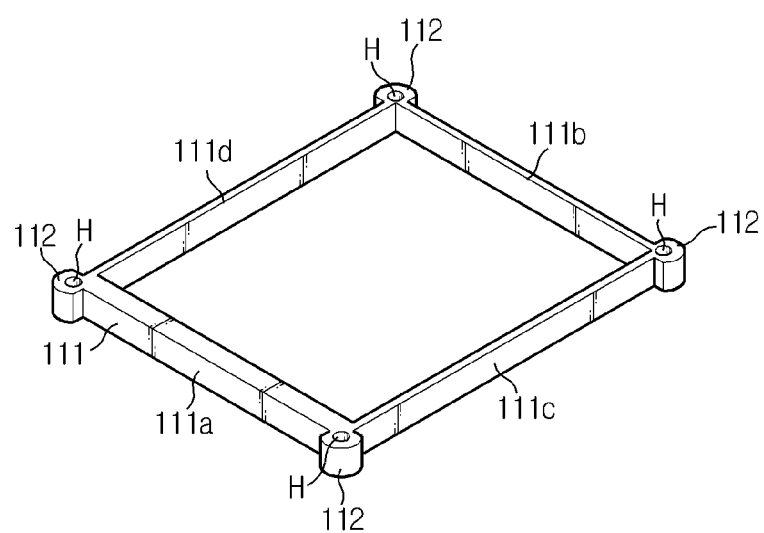
FIG. 15 is a diagram schematically illustrating a secondary battery frame according to another exemplary embodiment of the present disclosure.

FIG. 15 is a diagram schematically illustrating a frame of a secondary battery according to another exemplary embodiment of the present disclosure.

Referring to FIG. 15, the first protrusion, the second protrusion, the third protrusion and the fourth protrusion are integrally formed with the frame body 111. According to this exemplary embodiment, there are advantages in that the manufacture of the protrusion 112 and the manufacture of the frame are concurrently performed, resulting in a simple manufacturing process, and the bond strength of the frame body 111 and the protrusion 112 increases, thereby improving durability.

Although FIG. 15 shows that all the protrusions 112 are each integrally formed with the frame body 111, this is just an example and it is obvious that in alternative exemplary embodiments, some of the protrusions 112 may not be integrally formed with the frame body 111.

In the exemplary embodiment of FIG. 15, the protrusion 112 has a hollow (H). The hollow (H) defines an empty space in the protrusion 112. The hollow (H) serves not only to buffer the deformation of the secondary battery frame 120 caused by the expansion of the secondary battery, but also to mitigate the impacts that may be applied to the secondary battery frame 120 by some causes, for example, the fall of the secondary battery frame 120.

Figure 16:
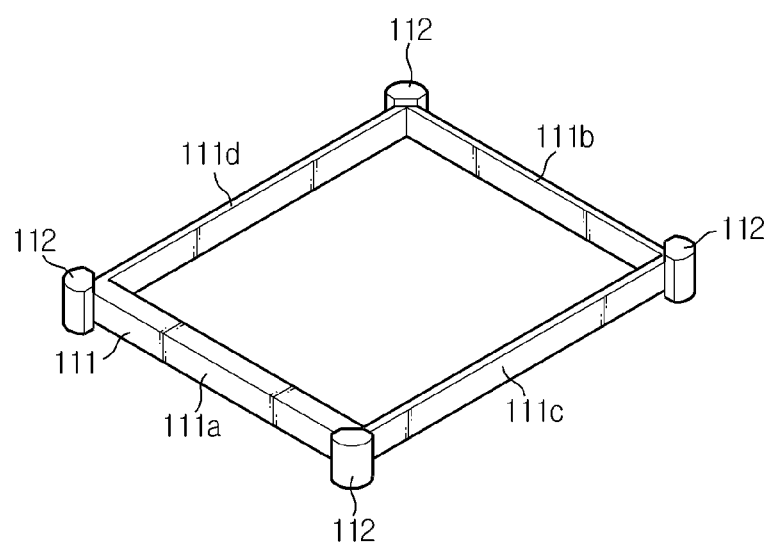
FIG. 16 is a diagram schematically illustrating a secondary battery frame according to another exemplary embodiment of the present disclosure.
Figure 17:
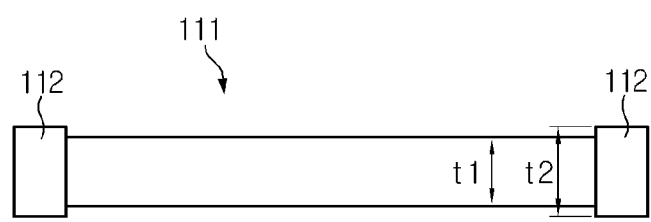
FIG. 17 is a side view of FIG. 16.

FIG. 16 is a diagram schematically illustrating a frame of a secondary battery according to another exemplary embodiment of the present disclosure, and FIG. 17 is a side view of FIG. 16.

Referring to FIGS. 16 and 17, a thickness (t2) of the protrusion 112 may be greater than a thickness (t1) of the frame body 111. According to this exemplary embodiment, the standards of the battery pack changing with the thickness of the label film 140 surrounding the thicknesswise direction of the frame body may be prevented. Also, according to this exemplary embodiment, dimension management may be achieved even if the pouch-type secondary battery 120 expands in the thicknesswise direction. This is because as much extra space for dimension management as a difference between the thickness of the protrusion 112 and the thickness of the frame body 111 in the thicknesswise direction is formed. Thus, for effective dimension management in the thicknesswise direction, in alternative exemplary embodiments, the plate may be formed at the front side and/or rear side of the frame body 111.

Also, preferably, the frame body 111 and the protrusion 112 may be made of plastics. According to this exemplary embodiment, the frame body 111 and the protrusion 112 may be manufactured by plastic molding, which may ease the manufacturing. Particularly, according to an exemplary embodiment in which the frame body 111 and the protrusion 112 are integrally formed, the secondary battery frame 110 may be manufactured by one plastic molding process.

Also, preferably, a portion of the corner of at least one of the top plate 111a, the bottom plate 111b, the left plate 111c, and the right plate 111d may have a round shape.

FIG. 17 is a partially enlarged view of a secondary battery frame according to another exemplary embodiment of the present disclosure. More specifically, FIG. 18 is a partially enlarged view of one of the top plate 111a, the bottom plate 111b, the left plate 111c, and the right plate 111d, here, the left plate 111c, corresponding to section D of FIG. 6.

Figure 18:
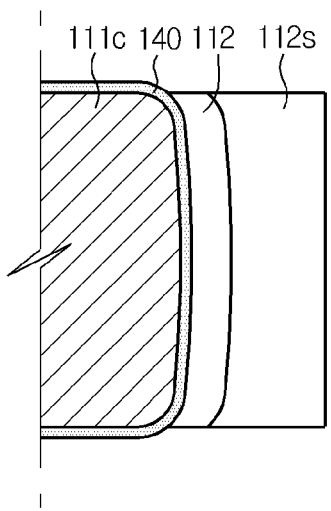
FIG. 18 is a partially enlarged view of a frame according to another exemplary embodiment of the present disclosure.

Referring to FIG. 18, the left plate 111c has a round shape at the corner. As shown, when the left plate 111c has a round shape at the corner, the label film 140 may be adhered to the secondary battery frame 110 more easily. That is, when the left plate 111c has a round shape at the corner, the label film 140 may be smoothly bent in the shape of a curve rather than being bent at an angle at the corner part, and may be adhered to the left plate 111c. Thus, the corner of the round shape may prevent the label film 140 from being loosely adhered. It is preferred to keep the label film 140 from being loosely adhered in that when the adhesion of the label film 140 gets loose, there may be a change in dimension in the loose direction.

Also, preferably, a stopper step 112s protrusively formed from the protrusion 112 may be provided on at least one surface of the protrusion 112. The stopper step 112s is protrusively formed from at least one surface of the protrusion 112 and may prevent or minimize the likelihood that the label film 140 gets loose in an outward direction of the secondary battery frame 110.

Referring back to FIG. 18, it can be seen that the protrusion 112 formed at the bottom edge of the left plate 111c has the stopper step 112s. The stopper step 112s allows the label film 140 to be stuck therein to prevent the label film 140 from escaping from the extra space of the protrusion 112, even if the label film 140 gets loose from the secondary battery frame 110. That is, a change in dimension may be prevented even if the label film 140 gets loose.

Also, preferably, at least one of the top plate 111a, the bottom plate 111b, the left plate 111c, and the right plate 111d may be equipped with a mounting part to mount the protection circuit 130.

Figure 19:
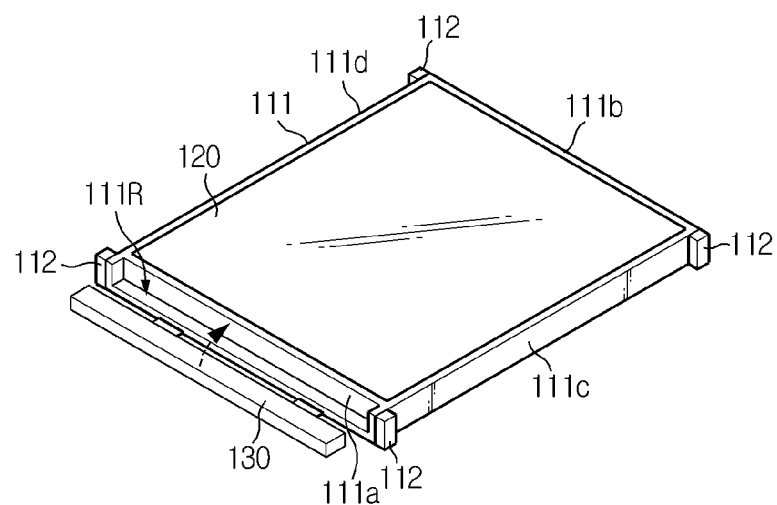
FIG. 19 is a partially enlarged view of a frame according to another exemplary embodiment of the present disclosure.

FIG. 19 is a partially enlarged view of a secondary battery frame according to another exemplary embodiment of the present disclosure. Referring to FIG. 19, a mounting part 111R for mounting the protection circuit 130 is provided in the top plate 111a of the secondary battery frame 110 according to another exemplary embodiment of the present disclosure.

In FIG. 19, the mounting part 111R is formed in a space created by making a certain part of the top plate 111a recessed inward. That is, the protection circuit 130 may be mounted on the inward recess of the top plate 111a. In this instance, the electrode tab of the secondary battery 120 is attached onto one surface of the protection circuit 130, and the protection circuit 130 is rotated 180 degrees (see the arrow of FIG. 20) with the electrode tab attached onto one surface, and then is mounted in the mounting part 111R of the top plate 111c.

Although FIG. 19 illustrates an exemplary embodiment in which the mounting part 111R is formed in the top plate 111a, the location of the mounting part is not limited thereto. That is, it is obvious that the mounting part may be formed in the other plates than the top plate, but the mounting part is preferably formed in the plate disposed in the direction in which the electrode tab is exposed as shown in FIG. 19.

Figure 20:
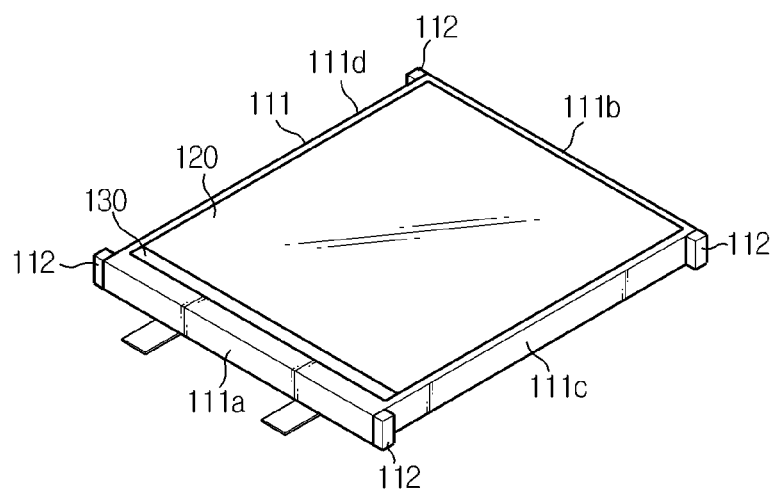
FIG. 20 is a diagram schematically illustrating a battery pack according to another exemplary embodiment of the present disclosure.

FIG. 20 is a diagram schematically illustrating a battery pack according to an exemplary embodiment of the present disclosure.

Referring to FIG. 20, the battery pack 100 according to the present disclosure includes the pouch-type secondary battery 120, the secondary battery frame 110, and the protection circuit 130.

The pouch-type secondary battery 120 is manufactured by surrounding a cell assembly using a pouch case such that the cell assembly is embedded and an electrode lead attached to one end of the cell assembly is exposed to outside and then performing heat fusion on the pouch case around the cell assembly The protection circuit 130 corresponds to a circuit for protecting the battery pack 100 from overcharge, overdischarge, and the like, and is electrically connected to the electrode lead of the pouch-type secondary battery 120. The protection circuit 130 may include a fuse device, a voltage and/or current measurement device, and the like, to protect the battery pack 100. The function and configuration of the protection circuit 130 is known to any person having ordinary skill in the technical field to which the present disclosure belongs, and its detailed description is omitted herein.

The foregoing description may be equally applied to the characteristics of the secondary battery frame 110 provided in the battery pack 100 according to the present disclosure, and its detailed description is omitted herein.

The secondary battery frame 110 includes the frame body 111 and the protrusion 112. The frame body 111 includes the top plate 111a surrounding the circumferential area through which the electrode lead is exposed among the circumferential area of the pouch-type secondary battery 120, the left plate 111 c connected to the left edge of the top plate 111a, the right plate 111d connected to the right edge of the top plate 111a, and the bottom plate 111b connected to the bottom edge of the left plate 111c and the bottom edge of the right plate 111d. The protrusion 112 is protrusively formed from at least one of the top plate 111a, the bottom plate 111b, the left plate 111c, and the right plate 111d in the outward direction of the frame body 111.

Preferably, the protrusion 112 may be formed at the corner of at least one of the four corners formed by adjacent two plates of the top plate 111a, the bottom plate 111b, the left plate 111c, and the right plate 111d.

More preferably, each protrusion 112 may be formed at the top edge and the bottom edge of the left plate 111c and the top edge and the bottom edge of the right plate 111d.

Also, preferably, each protrusion 112 may be formed at the left edge and the right edge of the top plate 111a and the left edge and the right edge of the bottom plate 111b.

Also, preferably, each protrusion 112 may be formed at the top edge and the bottom edge of the left plate 111c, the top edge and the bottom edge of the right plate 111d, the left edge and the right edge of the top plate 111a, and the left edge and the right edge of the bottom plate 111b.

More preferably, the protrusion 112 formed at the top edge of the left plate 111c and the protrusion 112 formed at the left edge of the top plate 111a are interconnected to form a first protrusion, the protrusion 112 formed at the top edge of the right plate 111 d and the protrusion 112 formed at the right edge of the top plate 111a are interconnected to form a second protrusion, the protrusion 112 formed at the bottom edge of the left plate 111c and the protrusion 112 formed at the left edge of the bottom plate 111b are interconnected to form a third protrusion, and the protrusion 112 formed at the bottom edge of the right plate 111d and the protrusion 112 formed at the right edge of the bottom plate 111b are interconnected to form a fourth protrusion.

More preferably, at least a portion of the corner of at least one protrusion 112 of the first protrusion, the second protrusion, the third protrusion, and the fourth protrusion may have a round shape.

Also, preferably, the protrusion 112 may be integrally formed with the frame body 111.

Also, preferably, the protrusion 112 may have a thickness greater than a thickness of the frame body 111.

Also, preferably, the frame body 111) and the protrusion 112 may be made of plastics.

Certain features described in the context of separate exemplary embodiments can also be implemented in combination in a single exemplary embodiment. Conversely, various features described in the context of a single exemplary embodiment can also be implemented in multiple exemplary embodiments separately or in any suitable subcombination.

In the above detailed description or drawings of the present disclosure, the terms used herein, such as upper, lower, left, right, inward, outward, and the like, is a relative term for distinguishing one element from another, and it should be noted that the terms are merely used as an instrumental concept for increasing the efficiency of description, but not as a concept for identifying a physical location and an order by an absolute standard.

While the present disclosure has been described in connection with only a limited number of exemplary embodiments and drawings, the present disclosure is not limited thereto and it should be understood that various modifications and changes may be made by those skilled in the art within the spirit of the invention and the appended claims and their equivalents.

What is claimed is:

1. A secondary battery frame used to package a pouch-type secondary battery, the secondary battery frame comprising:
    a frame body comprising a top plate surrounding a circumferential area through which an electrode lead is exposed among a circumferential area of the pouch-type secondary battery, a left plate connected to a left edge of the top plate, a right plate connected to a right edge of the top plate, and a bottom plate connected to a bottom edge of the left plate and a bottom edge of the right plate; and
    a protrusion protrusively formed from at least one of the top plate, the bottom plate, the left plate, and the right plate in an outward direction of the frame body,
    wherein the protrusion is formed on at least one of four corners formed by adjacent two plates of the top plate, the bottom plate, the left plate, and the right plate,
    wherein each protrusion is formed at the top edge and the bottom edge of the left plate, the top edge and the bottom edge of the right plate, the left edge and the right edge of the top plate, and the left edge and the right edge of the bottom plate,
    wherein the protrusion formed at the top edge of the left plate and the protrusion formed at the left edge of the top plate are interconnected to form a first protrusion, the protrusion formed at the top edge of the right plate and the protrusion formed at the right edge of the top plate are interconnected to form a second protrusion, the protrusion formed at the bottom edge of the left plate and the protrusion formed at the left edge of the bottom plate are interconnected to form a third protrusion, and the protrusion formed at the bottom edge of the right plate and the protrusion formed at the right edge of the bottom plate are interconnected to form a fourth protrusion.

2. The secondary battery frame according to claim 1, wherein at least a portion of the corner of at least one of the first protrusion, the second protrusion, the third protrusion, and the fourth protrusion has a round shape.

3. The secondary battery frame according to claim 1, wherein the protrusion is integrally formed with the frame body.

4. The secondary battery frame according to claim 1, wherein the protrusion has a thickness greater than a thickness of the frame body.

5. The secondary battery frame according to claim 1, wherein the frame body and the protrusion are made of plastics.

6. A battery pack comprising:
    a pouch-type secondary battery;
    a secondary battery frame comprising a frame body and a protrusion, the frame body comprising a top plate surrounding a circumferential area through which an electrode lead is exposed among a circumferential area of the pouch-type secondary battery, a left plate connected to a left edge of the top plate, a right plate connected to a right edge of the top plate, and a bottom plate connected to a bottom edge of the left plate and a bottom edge of the right plate, and the protrusion protrusively formed from at least one of the top plate, the bottom plate, the left plate, and the right plate in an outward direction of the frame body; and
    a protection circuit electrically connected to the electrode lead,
    wherein the protrusion is formed on at least one of four corners formed by adjacent two plates of the top plate, the bottom plate, the left plate, and the right plate,
    wherein each protrusion is formed at the top edge and the bottom edge of the left plate, the top edge and the bottom edge of the right plate, the left edge and the right edge of the top plate, and the left edge and the right edge of the bottom plate,
    wherein the protrusion formed at the top edge of the left plate and the protrusion formed at the left edge of the top plate are interconnected to form a first protrusion, the protrusion formed at the top edge of the right plate and the protrusion formed at the right edge of the top plate are interconnected to form a second protrusion, the protrusion formed at the bottom edge of the left plate and the protrusion formed at the left edge of the bottom plate are interconnected to form a third protrusion, and the protrusion formed at the bottom edge of the right plate and the protrusion formed at the right edge of the bottom plate are interconnected to form a fourth protrusion.

7. The battery pack according to claim 6, wherein at least a portion of the corner of at least one of the first protrusion, the second protrusion, the third protrusion, and the fourth protrusion has a round shape.

8. The battery pack according to claim 6, wherein the protrusion is integrally formed with the frame body.

9. The battery pack according to claim 6, wherein the protrusion has a thickness greater than a thickness of the frame body.

10. The battery pack according to claim 6, wherein the frame body and the protrusion are made of plastics.

* * * * *